United States Patent [19]

Zweekly et al.

[11] Patent Number: 4,626,140
[45] Date of Patent: Dec. 2, 1986

[54] CHIP CONTROL INSERT

[75] Inventors: Raymond Zweekly; Tony M. Lowe, both of Royal Oak, Mich.

[73] Assignee: GTE Valeron Corporation, Troy, Mich.

[21] Appl. No.: 785,211

[22] Filed: Oct. 7, 1985

Related U.S. Application Data

[63] Continuation-in-part of Ser. No. 725,639, Apr. 22, 1985.

[51] Int. Cl.$^4$ .................... B23B 27/22; B26D 1/00
[52] U.S. Cl. ........................................ 407/114; 407/62
[58] Field of Search ............................ 407/113–116, 407/7, 62, 64

[56] References Cited

U.S. PATENT DOCUMENTS

| | | | |
|---|---|---|---|
| 2,863,209 | 12/1958 | Klopfer | 407/115 |
| 3,383,748 | 5/1968 | Galimberti et al. | 407/114 |
| 4,215,957 | 8/1980 | Holma et al. | 407/114 |
| 4,273,480 | 6/1981 | Shirai et al. | 407/114 |
| 4,335,984 | 6/1982 | Zweekly | 407/114 |
| 4,465,412 | 8/1984 | Zweekly | 407/114 |

FOREIGN PATENT DOCUMENTS 2057939  4/1981  United Kingdom ............... 407/114

Primary Examiner—Francis S. Husar
Assistant Examiner—Jerry Kearns
Attorney, Agent, or Firm—Lloyd M. Forster

[57] ABSTRACT

Circular chip control insert including a plurality of peripheral arcuate scallops having adjacent intersections terminating in points at the cutting edge of the insert providing a wedge effect in dividing and breaking chips.

18 Claims, 3 Drawing Figures

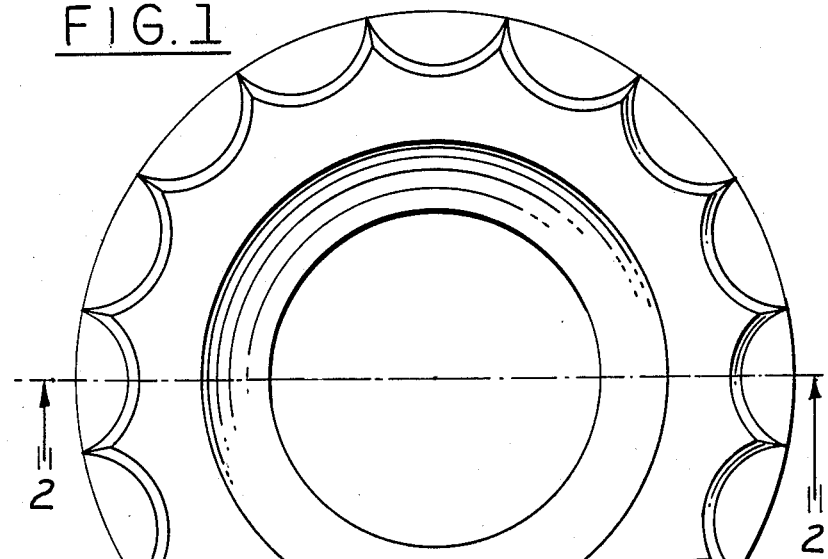
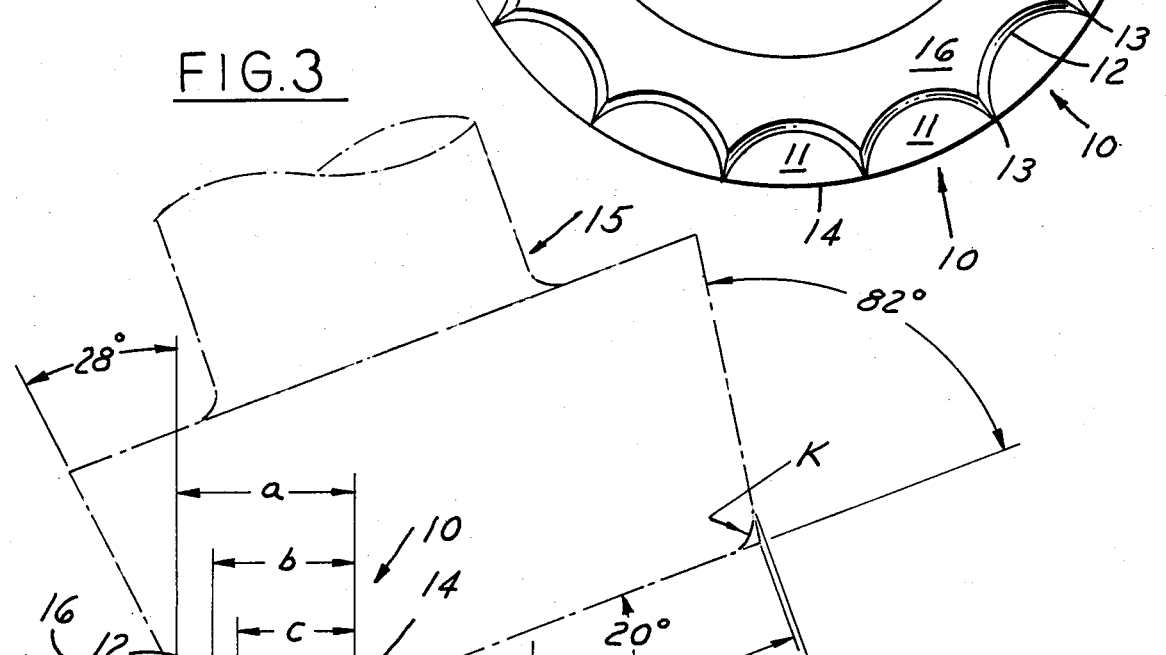
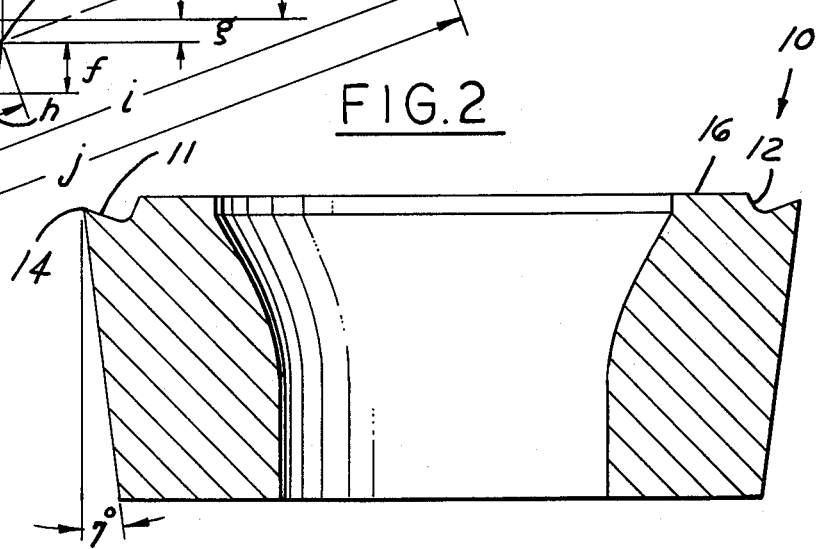

CHIP CONTROL INSERT

This invention is a continuation-in-part of co-pending application Ser. No. 725,639 filed Apr. 22, 1985 for Circular Chip Control Insert.

BACKGROUND OF THE INVENTION

Circular inserts for use in lathe tools and the like have been constructed with uniform chip control grooves provided in the outer periphery of the cutting face adjacent and sometimes extending to the cutting edge.

It is also known in the art to provide a succession of chip control recesses formed on the cutting face at the outer periphery along the cutting edge which are generally spherical and may intersect or contact each other as well as the cutting edge as shown in U.S. Pat. No. 4,273,480 or may intersect the cutting edge with space between the depressions as disclosed in U.S. Pat. No. 4,215,957. The latter patent also discloses alternative depressions which are generally rectangular with inner corners spaced from the cutting edge being rounded. Depressions such as disclosed in the latter patent are also believed to have been disposed around the periphery of circular inserts for use in lathe tools in a manner similar to the present invention.

In the aforementioned co-pending application, circular inserts are disclosed with overlapping depressions in the cutting face intersecting the cutting edge which are formed as arcuate segments of a conical form having a laterally extending cone axis intersecting the cutter axis. The depressions are preferably spaced at 30° intervals and extend in a vertical direction to a depth providing approximately two-thirds overlap at the cutting edge perimeter. At each overlapping area a secondary conical depression form is provided with the axis of the cone bisecting the overlapping area in plan view. In preparing a master insert a conical grinder is employed having oppositely tapered intersecting conical surfaces adapted respectively to form the inner extremity of each depression at a relatively steep angle and the main portion of each depression at a relatively shallow angle relative to the cutting face.

BRIEF DESCRIPTION OF THE PRESENT INVENTION

Applicants have produced an improved circular cutter insert with a modified scallop design in which adjacent scallop depressions intersect in points at or very close to the perimeter cutting edge producing a chip separating wedge effect at each scallop intersection. The master scallop form is produced by a grinder having a 16° included angle conical surface decreasing in diameter to a flat circular end with a small intersection radius. In forming an individual scallop, the end of the grinder is presented at a 20° angle to the insert face to create a typical 20° positive rake scallop surface extending back from the cutting edge to a back wall formed by the conical grinder surface producing a 98° obtuse included angle scallop depression.

A substantial number of relatively small scallops are provided, for example 24 in a ⅜" dia. insert; 18 in a ½" dia.; and 12 in a ⅜" dia. Each scallop formed by the grinder has a maximum inward extension from the cutting edge equal to approximately ¼ of the grinder diameter at the end surface with a plunge depth at the center line of each scallop producing an edge surface approximately 0.005" below the face of the insert.

The result of this scallop design, as mentioned above, is to provide a wedge effect at each intersection of adjacent scallops terminating at or just short of the cutting edge which, together with the positive rake and steep back wall of each scallop, serve to effectively control chip separation with no need for controlled incremental indexing of the insert.

In production, the scallops are pressed in a powdered metal blank with grinding limited to the bottom face and positive rake conical perimeter of the insert.

BRIEF DESCRIPTION OF THE DRAWINGS

FIG. 1 is a plan view of a typical preferred embodiment of the present invention.

FIG. 2 is a sectional view taken along the line of FIG. 1.

FIG. 3 is a further enlarged fragmentary sectional view of a single scallop illustrating in phantom the grinder orientation for forming a master insert.

DETAILED DESCRIPTION OF PREFERRED EMBODIMENT

With reference to FIG. 1 the enlarged plan view of the insert illustrates sixteen scallops 10 appropriate for a twelve mm. diameter insert. Each scallop has a planar bottom surface 11 and an arcuate back wall 12 intersecting adjacent scallops at points 13 at or immediately adjacent cutting edge 14 providing a wedge effect at each scallop intersection.

The form of a typical scallop is established on a master by a grinding wheel 15 as shown in phantom in the further enlarged view of FIG. 3. From this view it will be seen that the basic dimensions of the grinder include a 16° included angle conical form presented with its end surface at a 20° angle to the face of the insert providing a positive rake scallop surface 11 and a 28° angle of backwall 12 relative to the axis of the insert.

A 7° conical taper on the outer perimeter of the insert establishes a 63° positive rake cutting edge. The dimensions identified in FIG. 3 by reference letters a-k represent respectively—a—maximum radial extent of the scallop at the midsection; —b—radial dimension at the intersection of extended grinder conical and end surfaces; —c—radial dimension at the beginning of the corner radius; —d—depth of scallop at projected intersection of conical and end surfaces of the grinder; —e—maximum depth of scallop at bottom of radius; —f—reference dimension from cutting edge at center of scallop to projected intersection of conical and end surfaces of grinder; —g—depth of cutting edge at center of scallop below face of insert; —h—reference dimension from cutting edge at center of scallop to projected intersection of conical and end surfaces of grinder; —i—diameter at such intersection; —j—diameter of grinder at beginning of corner radius; and —k—the corner radius of grinder.

A tabulation of these dimensions for four typical insert diameter is provided below with two additional dimensions, —l— representing the height of each scallop intersection at its lowest point nearest the cutting edge; and —m—the radial extent of the scallop intersection from the cutting edge to its highest point of intersection with the face of insert 16.

|   | ⅜" | 12 mm. | ½" | ⅝" |
|---|---|---|---|---|
| a | 0.036" | 0.040" | 0.040" | 0.040" |
| b | 0.028" | 0.031" | 0.031" | 0.031" |

-continued

|   | ⅜" | 12 mm. | ½" | ⅝" |
|---|---|---|---|---|
| c | 0.023" | 0.023" | 0.023" | 0.023" |
| d | 0.0152" | 0.0163" | 0.0163" | 0.0163" |
| e | 0.0137" | 0.0140" | 0.0140" | 0.0140" |
| f | 0.010" | 0.011" | 0.011" | 0.011" |
| g | 0.005" | 0.005" | 0.005" | 0.005" |
| h | 0.0245" | 0.033" | 0.033" | 0.033" |
| i | 0.1334" | 0.1274" | 0.1224" | 0.1224" |
| j | 0.135" | 0.130" | 0.125" | 0.125" |
| k | 0.006" | 0.010" | 0.010" | 0.010" |
| l | 0.0011" | 0.0003" | 0" | 0" |
| m | 0.0096" | 0.0178" | 0.0200" | 0.0232" |

It will be noted that in the case of the ½" and ⅝" diameter inserts the lowermost point of intersection is zero indicating a terminal runout in the adjacent bottom surfaces 11 before reaching the cutting edge, while in the case of the ⅜" diameter insert the lowest point of intersection is 0.0011" above the cutting edge, and in the case of the twelve mm. diameter insert, 0.0003" above the cutting edge. In practice it has been found important in order to minimize breakdown and wear of the intersection wedge that its terminal lowermost point should not exceed a maximum of 0.0015" above the cutting edge.

The round inserts provided with scallops of the number and dimensions described above can be indexed without incremental control relative to scallop positions. It has also been found that chip control is effective over a wide range of cutting depths including extremely fine finishing cuts where the wedge effect of each intersection divides and breaks the chips.

We claim:

1. A chip breaking insert characterized by a circular cutting face with a circular peripheral cutting edge, a plurality of chip breaking scallop depressions around the cutting face periphery adjacent the cutting edge forming adjacent ridges on said face which intersect each other in wedge points substantially at the cutting edge, each scallop comprising a bottm positive rake planar surface terminating in a conical segment backwall.

2. The insert of claim 1 wherein said planar surface and conical backwall are provided with an arcuate intersection.

3. The insert of claim 1 wherein said planar surface and conical backwall are provided with a radiused intersection.

4. The insert of claim 1 wherein said backwall extends in the order of 28° from normal to the insert face.

5. The insert of claim 1 wherein said planar scallop surface extends with a positive radial rake in the order of 20° relative to the face of the insert.

6. The insert of claim 1 wherein said scallop backwall extends at an included angle in the order of 98° relative to said planar surface.

7. The insert of claim 1 wherein said cutting edge extends in the order of 0.005" below the face of said insert at the center line of each scallop.

8. The insert of claim 1 wherein the intersection between adjacent scallops has a lowermost point in the order of 0.0015" maximum rise above the cutting edge.

9. The insert of claim 1 where each scallop has the form of the corner of intersecting conical and planar transverse end surfaces.

10. The insert of claim 1 wherein said scallop has the form of the corner of intersecting conical and planar transverse end surfaces with intersecting radius.

11. The insert of claim 1 wherein the extent of said scallop is in the order of ¼ of the conical diameter.

12. The insert of claim 1 wherein scallops are provided at intervals in the order of 0.010" of cutting edge perimeter.

13. The insert of claim 1 wherein said scallops are provided at intervals not exceeding 0.010" of cutting edge perimeter.

14. The insert of claim 1 having a ⅜" diameter with 12 scallops.

15. The insert of claim 1 having a 12 mm. diameter with 16 scallops.

16. The insert of claim 1 having a ½ diameter with 18 scallops.

17. The insert of claim 1 having a ⅝" diameter with 24 scallops.

18. The insert of claim 1 including a corner scallop radius in the order of 0.010".

* * * * *